(12) United States Patent
Winterton et al.

(10) Patent No.: US 10,067,223 B2
(45) Date of Patent: Sep. 4, 2018

(54) DETERMINING REFLECTANCE OF A TARGET USING A TIME OF FLIGHT RANGING SYSTEM

(71) Applicants: STMicroelectronics, Inc., Coppell, TX (US); STMicroelectronics (Research & Development) Limited, Marlow, Buckinghamshire (GB)

(72) Inventors: Darin K. Winterton, San Jose, CA (US); Sam Lee, Edinburgh (GB)

(73) Assignees: STMicroelectronics (Research & Development) Limited, Marlow (GB); STMicroelectronics, Inc., Coppell, TX (US)

( * ) Notice: Subject to any disclaimer, the term of this patent is extended or adjusted under 35 U.S.C. 154(b) by 486 days.

(21) Appl. No.: 14/809,384

(22) Filed: Jul. 27, 2015

(65) Prior Publication Data

US 2017/0031007 A1 Feb. 2, 2017

(51) Int. Cl.
*G01C 3/08* (2006.01)
*G01S 7/486* (2006.01)
*G01S 17/08* (2006.01)
*G01S 7/48* (2006.01)

(52) U.S. Cl.
CPC .......... *G01S 7/4861* (2013.01); *G01S 7/4802* (2013.01); *G01S 17/08* (2013.01)

(58) Field of Classification Search
CPC ....... G01S 7/4861; G01S 7/4802; G01S 17/08
See application file for complete search history.

(56) References Cited

U.S. PATENT DOCUMENTS

| 5,747,813 | A * | 5/1998 | Norton | G01B 11/0625 250/339.11 |
| 6,312,075 | B1 * | 11/2001 | Walker | B41J 2/17566 347/19 |
| 9,784,835 | B1 * | 10/2017 | Droz | G01S 17/08 |
| 2015/0177369 | A1 * | 6/2015 | Kostamovaara | G01S 17/107 356/5.08 |

* cited by examiner

*Primary Examiner* — Samantha K Abraham
(74) *Attorney, Agent, or Firm* — Crowe & Dunlevy

(57) ABSTRACT

An electronic device includes a ranging light source and a reflected light detector. A logic circuit causes the ranging light source to emit ranging light at a target. Reflected light from the target is detected using the reflected light detector, with the reflected light being a portion of the ranging light that reflects from the target back toward the reflected light detector. An intensity of the reflected light is determined using the reflected light detector. A distance to the target is determined based upon time elapsed between activating the ranging light source and detecting the reflected ranging light. Reflectance of the target is calculated, based upon the intensity of the reflected light and the distance to the target.

17 Claims, 7 Drawing Sheets

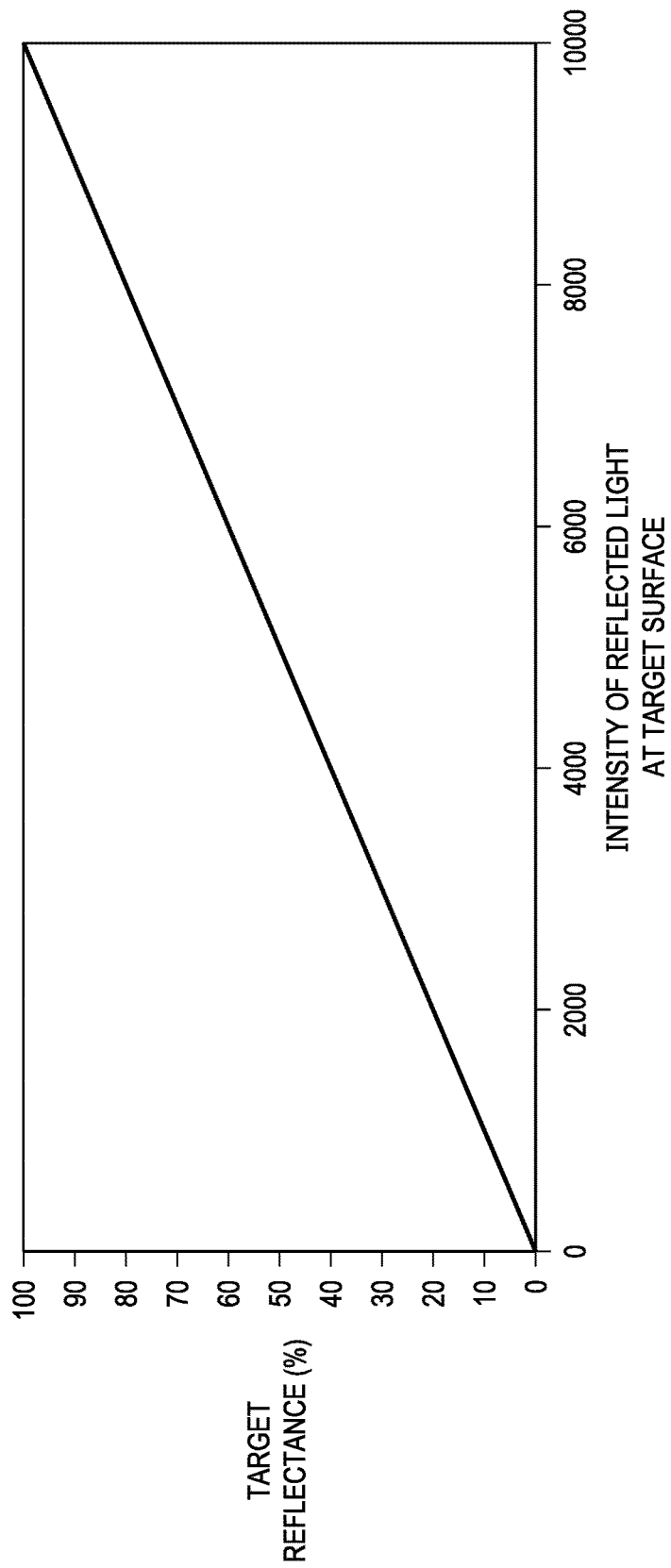

| TARGET REFLECTANCE = 50% | | | |
|---|---|---|---|
| TARGET DISTANCE | AVERAGE DISTANCE MEASURED | AVERAGE RETURN SIGNAL RATE | AVERAGE ESTIMATED REFLECTANCE OF TARGET |
| 10.000 | 9.625 | 113.175 | 48.416 |
| 11.000 | 10.292 | 111.542 | 49.203 |
| 12.000 | 11.517 | 107.633 | 50.121 |
| 13.000 | 12.308 | 104.325 | 50.242 |
| 14.000 | 13.450 | 99.242 | 50.138 |
| 15.000 | 14.517 | 95.958 | 50.765 |
| 16.000 | 15.683 | 92.208 | 51.265 |
| 17.000 | 16.583 | 87.400 | 50.401 |
| 18.000 | 17.625 | 85.175 | 51.369 |
| 19.000 | 18.292 | 81.392 | 50.426 |
| 20.000 | 19.400 | 79.367 | 51.555 |
| 21.000 | 21.117 | 75.392 | 52.611 |
| 22.000 | 21.325 | 72.058 | 50.698 |
| 23.000 | 22.600 | 69.242 | 51.383 |
| 24.000 | 23.792 | 66.758 | 52.042 |
| 25.000 | 24.500 | 63.058 | 50.639 |
| 26.000 | 25.608 | 59.958 | 50.417 |
| 27.000 | 26.525 | 57.858 | 50.532 |
| 28.000 | 27.525 | 55.425 | 50.449 |
| 29.000 | 28.933 | 53.017 | 51.110 |
| 30.000 | 29.675 | 51.467 | 51.143 |

FIG. 5A

| TARGET REFLECTANCE = 30% | | | |
|---|---|---|---|
| TARGET DISTANCE | AVERAGE DISTANCE MEASURED | AVERAGE RETURN SIGNAL RATE | AVERAGE ESTIMATED REFLECTANCE OF TARGET |
| 10.000 | 10.075 | 76.042 | 29.629 |
| 11.000 | 10.767 | 73.633 | 29.575 |
| 12.000 | 11.642 | 70.592 | 29.451 |
| 13.000 | 12.683 | 67.608 | 29.604 |
| 14.000 | 13.367 | 65.183 | 29.350 |
| 15.000 | 14.717 | 62.692 | 30.258 |
| 16.000 | 15.383 | 59.608 | 29.380 |
| 17.000 | 16.725 | 57.492 | 30.381 |
| 18.000 | 17.542 | 54.025 | 29.295 |
| 19.000 | 18.808 | 50.575 | 28.884 |
| 20.000 | 19.583 | 48.933 | 28.841 |
| 21.000 | 20.558 | 46.617 | 28.718 |
| 22.000 | 21.808 | 44.100 | 28.703 |
| 23.000 | 22.375 | 41.575 | 27.320 |
| 24.000 | 23.267 | 40.058 | 27.400 |
| 25.000 | 24.417 | 38.000 | 27.301 |
| 26.000 | 25.400 | 36.417 | 27.314 |
| 27.000 | 26.550 | 34.933 | 27.647 |
| 28.000 | 27.475 | 32.858 | 26.797 |
| 29.000 | 28.642 | 32.008 | 27.758 |
| 30.000 | 29.300 | 30.717 | 27.235 |

FIG. 5B

| TARGET REFLECTANCE = 90% | | | |
| --- | --- | --- | --- |
| TARGET DISTANCE | AVERAGE DISTANCE MEASURED | AVERAGE RETURN SIGNAL RATE | AVERAGE ESTIMATED REFLECTANCE OF TARGET |
| 10.000 | 8.967 | 170.092 | 73.340 |
| 11.000 | 10.633 | 165.483 | 75.742 |
| 12.000 | 11.150 | 163.567 | 76.227 |
| 13.000 | 12.500 | 160.917 | 81.638 |
| 14.000 | 13.542 | 157.475 | 84.547 |
| 15.000 | 14.758 | 153.292 | 85.991 |
| 16.000 | 15.675 | 148.725 | 86.328 |
| 17.000 | 17.342 | 143.900 | 88.351 |
| 18.000 | 18.325 | 140.067 | 88.962 |
| 19.000 | 19.267 | 135.483 | 89.040 |
| 20.000 | 20.533 | 131.383 | 89.951 |
| 21.000 | 21.625 | 127.425 | 90.422 |
| 22.000 | 22.842 | 123.192 | 90.923 |
| 23.000 | 23.133 | 119.467 | 89.825 |
| 24.000 | 24.517 | 115.075 | 90.389 |
| 25.000 | 25.858 | 111.542 | 91.109 |
| 26.000 | 26.633 | 107.733 | 90.716 |
| 27.000 | 27.733 | 104.092 | 90.813 |
| 28.000 | 28.650 | 100.992 | 90.832 |
| 29.000 | 29.908 | 97.092 | 90.883 |
| 30.000 | 30.342 | 94.100 | 90.240 |

FIG. 5C

DETERMINING REFLECTANCE OF A TARGET USING A TIME OF FLIGHT RANGING SYSTEM

TECHNICAL FIELD

This disclosure relates to the field of range detection, and more particularly, to the use of ranging systems, such as time of flight ranging system, to determine the reflectance of a target.

BACKGROUND

Ranging systems are used in a variety of technologies today. For example, a proximity sensor can be used to trigger a security light when an object comes within a predetermined distance of the security light, a ranging system can be used to determine the distance between a printing mechanism and paper on which it is to print, or a ranging system can be used by a digital camera or smartphone for purposes of improving autofocus algorithms.

However, typical ranging systems merely deliver as output a distance to the target. Depending on the ranging system, this distance may be sufficiently accurate, however the reflectance of the target (i.e. the percentage of light emitted by the ranging system that reflects back from the target) may in some instances degrade the accuracy. In addition, for some desired uses, it is helpful to know the reflectance of the target in addition to the distance from the target.

Therefore, further development of ranging systems also capable of determining the reflectance of a target are needed.

SUMMARY

An electronic device includes a ranging light source and a reflected light detector. A logic circuit causes the ranging light source to emit ranging light at a target. Reflected light from the target is detected using the reflected light detector, with the reflected light being a portion of the ranging light that reflects from the target back toward the reflected light detector. An intensity of the reflected light is determined using the reflected light detector. A distance to the target is determined based upon time elapsed between activating the ranging light source and detecting the reflected ranging light. Reflectance of the target is calculated, based upon the intensity of the reflected light and the distance to the target.

The logic circuit may be further configured to determine a color of the target based upon the reflectance of the target. In addition, the logic circuit may be configured to calculate the reflectance by calculating an intensity of the reflected light at a surface of the target as a product of the intensity of the reflected light at the reflected light detector and a square of the distance to the target, and determining the reflectance of the target based on the intensity of the reflected light at the surface of the target.

The logic circuit may calculate the reflectance as a function of a quotient of first and second exponential functions, with the first exponential function having the intensity of the reflected light as an offset and having the distance as an exponent of Euler's number, and with the second exponential function having an offset and having the distance to the target and a coarse reflectance as exponents of Euler's number.

The logic circuit is further may calculate a coarse reflectance as:

$$\text{Coarse Reflectance} = \frac{(\text{Intensity of the reflected light} - A * e^{B*Distance})}{C + D * e^{E*Distance}},$$

where A, B, C, D, and E are coefficients. In some examples, A is between −50 and −30, B is between −0.01 and −0.1, C is between 0.01 and 0.2, D is between 1 and 3, and E is between −0.01 and −0.1.

The logic circuit may be configured to calculate the reflectance as:

$$\text{Reflectance} = \frac{\text{Intensity of the reflected light} - A * e^{B*Distance}}{C + D * e^{(F+G*Coarse\ Reflectance)*Distacne}}$$

where A, B, C, D, F, and G are coefficients. In some examples, A is between −50 and −30, B is between −0.01 and −0.1, C is between 0.01 and 0.2, D is between 1 and 3, F is between −0.01 and −0.1, and G is between 0.0001 and 0.0005.

The logic circuit may be configured to calculate the reflectance as:

$$\text{Reflectance} = \frac{\frac{\text{Intensity}}{1 - e^{-(H*Distance^I)}} - J}{K}$$

where H, I, J, and K are coefficients. In some examples, H is between 300 and 500, wherein I is between −2 and −1, wherein J is between 18 and 28, and wherein K is between 1.1 and 2.1.

The logic circuit may be configured to normalize the intensity, based upon a reference reflected light detector, prior to calculation of the reflectance.

In some instances, a printing mechanism may be configured to attempt to print output on a piece of paper. The piece of paper may be the target. The logic circuit may be further configured to determine whether the printing mechanism successfully printed the output on the piece of paper based upon the reflectance of the piece of paper. The logic circuit may be further configured to determine an ink level of the printing mechanism based upon the reflectance of the piece of paper.

In some instances, a camera mechanism may have an autofocus function. The target may be in a field of view of the camera mechanism, and the logic circuit may be further configured to determine a maximum autofocus distance between the camera mechanism and the target based upon the reflectance of the target.

In some instances, the logic circuit is configured to, at a first point in time when it is assumed that the reflected light detector is not fully occluded by the target, estimate a reference intensity value representing intensity of the reflected light when the reflected light detector is fully occluded by the target as a function of an assumed reflectance and the distance to the target, and determine a coverage value representing a percentage of occlusion of the reflected light detector by the target as a function of a ratio between the intensity of the reflected light and the reference intensity value. The logic circuit may then calculate the reflectance at a second point in time when it is assumed that the reflected light detector is fully occluded by the target; and wherein the logic circuit is further configured to update the reference intensity value using the reflectance.

The ranging light source may be a vertical cavity surface emitting laser configured to emit the ranging light, and the reflected light detector may be a Geiger mode photodetector configured to detect the reflected light.

A method aspect may include determining distance to a target, and determining intensity of light reflected from the target. The method aspect may also include calculating a reflectance of the target as a function of the intensity of the light reflected from the target and distance to the target.

BRIEF DESCRIPTION OF THE DRAWINGS

FIG. 4 is a graph showing the relation between target reflectance and the intensity of reflected light at the surface of the target.

FIGS. 5A-5C show calculated vs. actual reflectances for varying targets at varying distances, where the calculated reflectances are calculated using techniques in accordance with this disclosure.

DETAILED DESCRIPTION

One or more embodiments in accordance with the principles of this disclosure will be described below. These described embodiments are only examples of techniques to implement the invention, as defined solely by the attached claims. Additionally, in an effort to provide a focused description of the invention and the principles of the invention, irrelevant features of an actual implementation may not be described in the specification.

Figure 1:
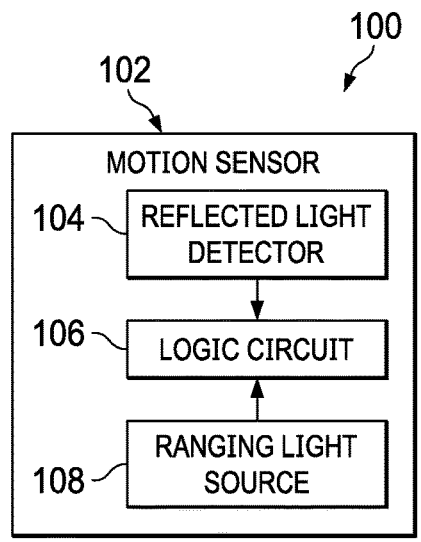
FIG. 1 is a block diagram of an electronic device on which the techniques of this disclosure may be performed.

With initial reference to FIG. 1, an electronic device 100 is now described. The electronic device 100 may be a desktop computer, laptop computer, tablet, smartphone, two dimensional printer (laser or inkjet, for example), three dimensional printer, or other device. The electronic device 100 includes a motion sensor 102 comprised of a ranging light source 108 and a reflected light detector 104 both coupled to a logic circuit 106.

The ranging light source 108 is preferably a vertical cavity surface emitting laser (VCSEL), although other ranging light sources as known to those of skill in the art may be used. The reflected light detector 104 is preferably a single photon avalanche diode or Geiger-mode avalanche photon diode, although other ranging light sources known to those of skill in the art may be used. Although one motion sensor 102 is shown, it should be appreciated that the electronic device 100 may include any number of motion sensors 102.

In operation, the ranging light source 108 emits light, and the reflected light detector 104 detects the light when it has reflected from a target and traveled back to the motion sensor 102. By measuring the time elapsed between emission of the light by the ranging light source 108 and the detection of the reflected light by the reflected light detector 104, since the speed of light is known and constant, the logic circuit 106 is able to determine the distance between the motion sensor 102 and the target off which the light has reflected.

In addition to detecting the duration of time between the ranging light source 108 emitting light and the reflected light detector 104 detecting the light reflected off the target, the intensity of the light reflected off the target is also detected by the motion sensor 102. By using the determined distance to the target and the intensity of the reflected light, the logic circuit 106 can determine the reflectance of the target.

Figure 2:
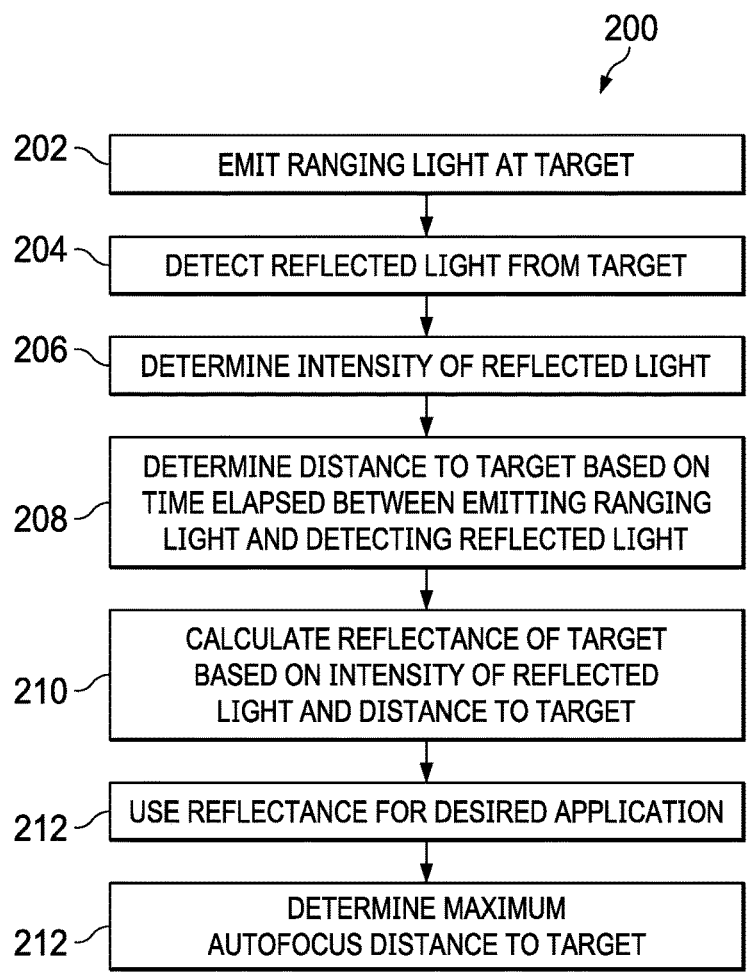
FIG. 2 is a flowchart of a method of operating the electronic device of FIG. 1 in accordance with this disclosure.

Thus, the electronic device 100 may be operated as will now be described with additional reference to the flowchart 200 of FIG. 2. Initially, the logic circuit 106 causes the ranging light source 108 to emit collimated ranging light at the target (Block 202). Thereafter, light reflected from the target is detected by the reflected light detector (Block 204). The light reflected from the target is the portion of the ranging light that reflects from the target back toward the reflected light detector.

Next, the logic circuit 106 determines the intensity of the reflected light, using the reflected light detector 104 (Block 206). Then, the logic circuit 106 determines the distance to the target based on the time elapsed between activating the ranging light source 108 and detected the reflected ranging light at the reflected light detector 104 (Block 208). The distance is calculated as the product of one half of the elapsed time and the speed of light.

The reflectance of the target is then calculated by the logic circuit 106 as a function of the intensity of the reflected light and the distance to the target. A variety of methods may be used to calculate the reflectance of the target and will be described below. After calculation of the reflectance of the target, the logic circuit 106 may then use the reflectance for a desired application (Block 212), such as determining a max autofocus distance to a target (Block 214) or determining a color of a target (Block 216).

Figure 3A:
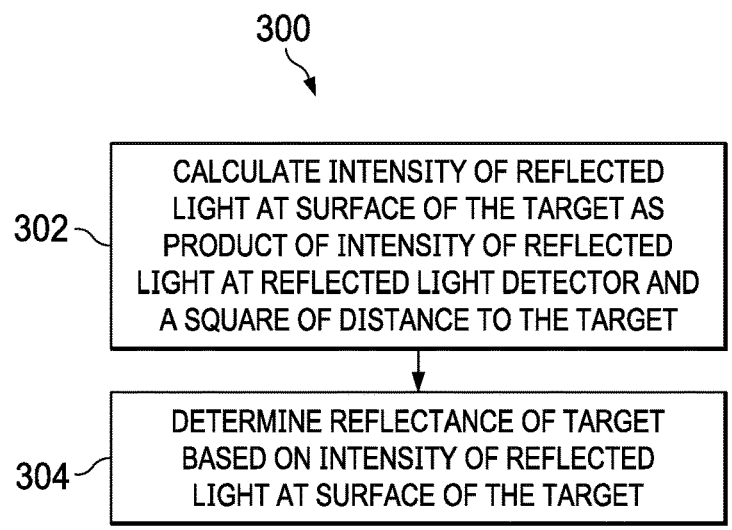
FIG. 3A is a flowchart of a method of calculating the reflectance of the target in accordance with this disclosure.

A first method of calculating the reflectance of the target is now described with additional reference to flowchart 300 of FIG. 3A. Here, the intensity of the reflected light at the surface of the target is calculated by the logic circuit 106 as a product of the intensity of the reflected light at the reflected light detector (and thus the intensity of the reflected light at the distance) and a square of the distance to the target (Block 302). Thereafter, the reflectance of the target is determined by the logic circuit 106 based on the intensity of the reflected light at the surface of the target (Block 304). This determination of the reflectance at Block 304 is made based upon the linear and proportional relation between the reflectance of the target and the intensity of the reflected light at the surface of the target, for example according to the line in the graph of target reflectance vs. reflected light intensity at surface of target shown in FIG. 4.

Another method of calculating the reflectance of the target when the distance to the target and the intensity of the reflected light is known is via the use of an equation formed to match curves of actual test data. Such an equation may be utilized by the logic circuit to calculate the reflectance a function of a quotient of first and second exponential functions. The first exponential function has the intensity of the reflected light as an offset and has the distance as an exponent of Euler's number. The second exponential function has an offset and has the distance to the target and a coarse reflectance as exponents of Euler's number.

Mathematically, the coarse reflectance can be calculated as:

$$\text{Coarse Reflectance} = \frac{(\text{Intensity of the reflected light} - A * e^{-1*B*\text{Distance}})}{C + D * e^{-1*E*\text{Distance}}}$$

where A is between 50 and 10, where B is between 0.01 and 0.1, where C is between 0.01 and 0.2, where D is between 1 and 3, and where E is between −0.01 and −0.1. A, B, C, D, and E are coefficients.

Particularly advantageous ranges for the coefficient values have been found where A is between 38 and 42, where B is between 0.03 and 0.05, where C is between 0.08 and 0.14, where D is between 2.4 and 2.7, and where E is between 0.03 and 0.05.

Especially advantageous values of the coefficients have been found where A is 40, where B is 0.04, where C is 0.11, where D is 2.58, and where E is 0.04.

Mathematically, the reflectance of the target can be represented as:

$$\text{Reflectance} = \frac{\text{Intensity of the reflected light} - A * e^{-1*B*\text{Distance}}}{C + D * e^{-1*(F+G*\text{Coarse Reflectance})*\text{Distacne}}}$$

where A is between 50 and 10, where B is between 0.01 and 0.1, where C is between 0.01 and 0.2, where D is between 1 and 3, where F is between 0.01 and 0.1, and where G is between −0.0001 and −0.0005. A, B, C, D, F, and G are coefficients.

For cases where the coarse reflectance is greater than 0.8 (i.e. 80%), particularly advantageous ranges for the coefficient values have been found where A is between 38 and 42, where B is between 0.03 and 0.05, where C is between 0.08 and 0.14, where D is between 2.4 and 2.7, where F is between 0.04 and 0.08, and where G is between −0.0002 and −0.0003. Especially advantageous values of the coefficients for cases where the coarse reflectance is greater than 0.8 have been found where A is 40, where B is 0.04, where C is 0.11, where D is 2.58, where F is 0.062, and where G is −0.00025.

For cases where the coarse reflectance is less than 0.05 (i.e. 5%), particularly advantageous ranges for the coefficient values have been found to be where A is between 18 and 22, where B is between 0.04 and 0.06, where C is between 0.08 and 0.14, where D is between 1.3 and 1.7, where F is between 0.04 and 0.08, and where G is between −0.0002 and −0.0003. Especially advantageous values of the coefficients for cases where the coarse reflectance is less than 0.05 have been found where A is 20, where B is 0.04, where C is 0.11, where D is 1.5, where F is 0.045, and where G is −0.00025.

For cases where the coarse reflectance is greater than 0.05 and less than 0.8 (i.e. greater than 5% and less than 80%), particularly advantageous ranges for the coefficient values have been found to be where A is between 38 and 42, where B is between 0.03 and 0.05, where C is between 0.08 and 0.14, where D is between 2.4 and 2.7, where F is between 0.04 and 0.08, and where G is between −0.0002 and −0.0003. Especially advantageous values of the coefficients for cases where the coarse reflectance is greater than 0.05 and less than 0.8 (i.e. greater than 5% and less than 80%) have been found where A is 40, where B is 0.04, where C is 0.11, where D is 2.58, where F is 0.057, and where G is −0.00025.

The inventors have found these equations to be particularly accurate in predicting the reflectance of a target. Example charts showing calculated reflectances for given known target reflectances at different distances and different intensities contained in FIGS. 5A-5C.

Another equation found to be accurate in predicting the reflectance of a target, can be represented as:

$$\text{Reflectance} = \frac{\frac{\text{Intensity}}{1 - e^{-(H*\text{Distance}^I)}} - J}{K}$$

where H is between 300 and 500, wherein I is between −2 and −1, where J is between 18 and 28, and where K is between 1.1 and 2.1. Particularly useful coefficients are where H is 400, I is −1.83, J is 23, and K is 1.61 in cases where the reflectance is greater than 0.05 and less than 0.9 (i.e. greater than 5% and less than 90%). When using this equation, the intensity may be normalized based upon a reference reflected light detector, prior to calculation of the reflectance.

Figure 6:
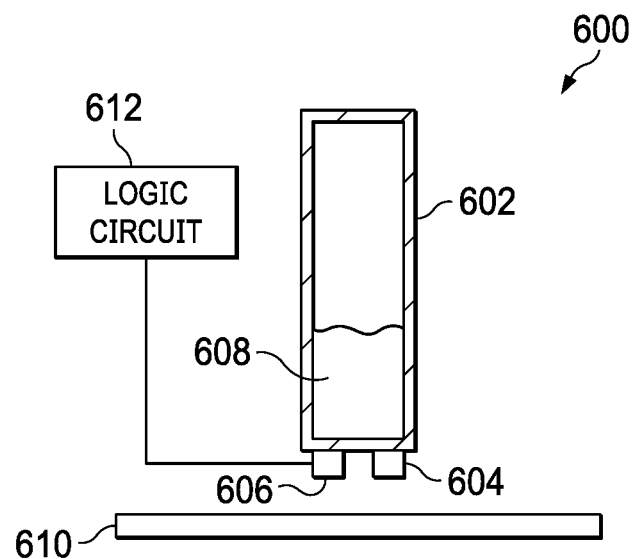
FIG. 6 is block diagram of a printing mechanism to which techniques of this disclosure may be applied.

There are numerous uses for knowledge of the reflectance of the target. Referring additionally to FIG. 6, for example, the electronic device 100 may include a printing mechanism 600 having an ink reservoir 602 and a print head 604. A ranging unit 606 containing a ranging light source and reflected light detector as described above is disposed proximate to the print head 604. The logic circuit 612 is coupled to the ranging unit 606.

In operation, the printing mechanism 600 attempts to print output on a piece of paper 610 using its print head 604. The logic circuit 612 operates the ranging unit 606 as described above so as to obtain the reflectance of a target spot on the paper 610. Based on the reflectance, the logic circuit 612 can then determine whether the printing mechanism 600 successfully printed the output on the paper 610.

In addition to determining whether output was successfully printed on the paper 610, the logic circuit 612 may also determine the ink level 608 in the ink reservoir 602 using the reflectance. Also, the logic circuit 612 may determine the color of the output printed on the paper 610 using the reflectance.

Figure 7:
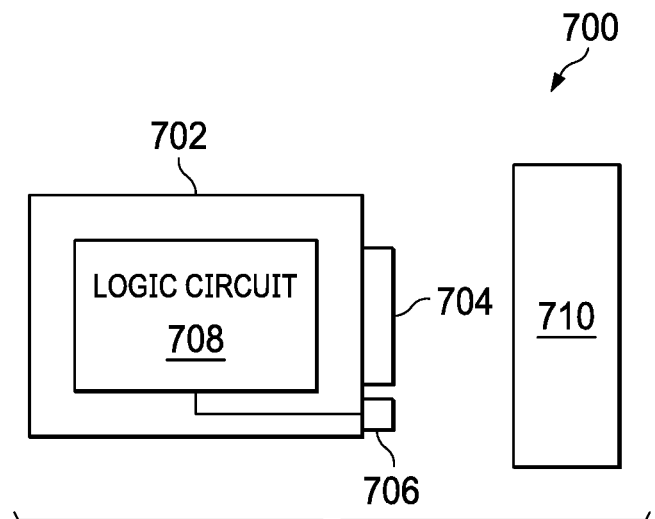
FIG. 7 is a block diagram of a camera to which techniques of this disclosure may be applied.

Another use for knowledge of the reflectance of the target is now described with additional reference to FIG. 7. The electronic device 100 may include a camera 700 with an image sensor 704 and a ranging unit 706 carried by a chassis 702. The ranging unit 706 is disposed proximate to the image sensor 704 and contains a ranging light source and reflected light detector as described above. The logic circuit 708 is coupled to the ranging unit 706.

In operation, the logic circuit 708 operates the ranging unit 706 as described above so as to obtain the reflectance of the target 710. Based on the reflectance, the logic circuit 708 can determine the maximum autofocus distance between the camera 700 and the target 710, and/or whether the target 710 is within the maximum autofocus distance. In addition, the logic circuit 708 can also adjust autofocus settings based upon the reflectance of the target 710.

Figure 3B:
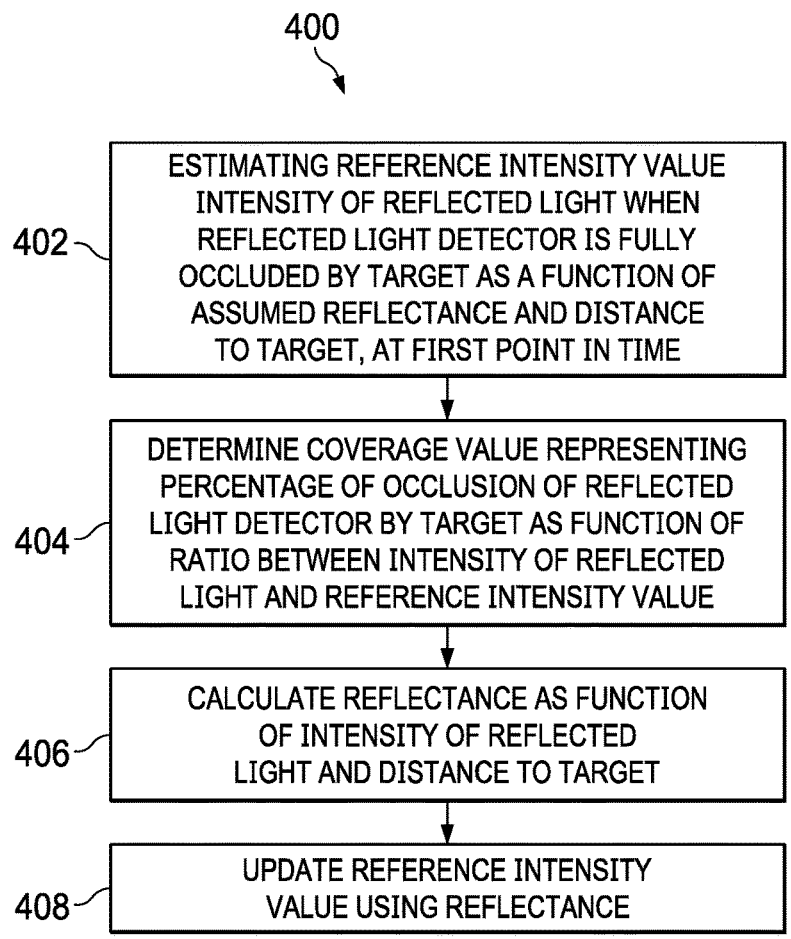
FIG. 3B is a flowchart of a method of calculating coverage of a motion sensor by a target in accordance with this disclosure.

Referring again to FIG. 1 and also to flowchart 400 of FIG. 3B, as will be appreciated by those of skill in the art, the electronic device 100 may be used for gesture identification and detection. In gesture identification, the percent occlusion of the reflected light detector or ranging light source by the target is a desired piece of data. While an initial calibration step can be performed so as to enable accurate percentage of occlusion determination, it may be desirable for such calibration step to not be necessary.

Therefore, the electronic device 100 may be operated as follows. Since it may be assumed that gestures begin with the hand or other gesturing body part out of the field of view of the ranging light source and reflected light detector, it may be assumed that at a first point in time, the reflected light detector 104 and ranging light source 108 are not fully occluded by the target (hand or other gesturing body part), but at second point of time later in the gesture, the reflected light detector 104 and ranging light source 108 are fully occluded by the target.

The formula used to calculate the percent occlusion (or coverage) of the reflected light detector 104 or ranging light source 108 is:

$$C = \frac{\text{Measured Intensity}}{\text{Intensity When Coverage is 100\%}}$$

where the intensity when coverage is 100% is a function of the distance to the target and the reflectance of the target.

Since the occlusion is not 100% at the first point in time, calculation of the reflectance could be highly inaccurate. Therefore, an assumed reflectance value (for example, 45%) together with the distance to the target is used to estimate the intensity when the coverage is 100% (Block 402). This is done by matching the distance to a known intensity curve for 45%. Then, the coverage C can be calculated by the logic circuit 106 using this estimated intensity together with the measured intensity, as per the formula above (Block 404).

At a second later point in time, it can be assumed that the coverage is 100%. Thus, at this point, the logic circuit 106 can calculate the reflectance of the target as described above (Block 406). The resulting reflectance value can when be used to update the reference intensity value, which can in turn be used to either correct the previous coverage value at the first point in time, or to calculate new coverage values at either the second point in time or other points of time (Block 408).

It should be appreciated that the logic circuit 106 may select the second point of time as the point of time at which the measured intensity is the greatest. However, if the target is actually not fully occluding the reflected light detector 104 or ranging light source 108, the accuracy of the coverage calculations may suffer.

Although some sample uses for the reflectance information have been described, it should be appreciated that the teachings herein are applicable to any application in which knowledge of the reflectance of a target is desired.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
   a ranging light source;
   a reflected light detector;
   a logic circuit configured to
      cause the ranging light source to emit ranging light at a target,
      detect reflected light from the target using the reflected light detector, the reflected light being a portion of the ranging light that reflects from the target back toward the reflected light detector,
      determine an intensity of the reflected light using the reflected light detector,
      determine a distance to the target based upon time elapsed between activating the ranging light source and detecting the reflected ranging light, and
      calculate reflectance of the target, based upon the intensity of the reflected light and the distance to the target;
      the reflectance being calculated as a function of a quotient of first and second exponential functions, the first exponential function having the intensity of the reflected light as an offset and having the distance as an exponent of Euler's number, the second exponential function having an offset and having the distance to the target and a coarse reflectance as exponents of Euler's number.

2. The electronic device of claim 1, wherein the logic circuit is further configured to determine a color of the target based upon the reflectance of the target.

3. The electronic device of claim 1, further comprising a printing mechanism configured to attempt to print output on a piece of paper; wherein the piece of paper is the target; and wherein the logic circuit is further configured to determine whether the printing mechanism successfully printed the output on the piece of paper based upon the reflectance of the piece of paper.

4. The electronic device of claim 3, wherein the logic circuit is further configured to determine an ink level of the printing mechanism based upon the reflectance of the piece of paper.

5. The electronic device of claim 1, further comprising a camera mechanism with an autofocus function; wherein the target is in a field of view of the camera mechanism; and wherein the logic circuit is further configured to determine a maximum autofocus distance between the camera mechanism and the target based upon the reflectance of the target.

6. The electronic device of claim 1, wherein the ranging light source comprises a vertical cavity surface emitting laser configured to emit the ranging light; wherein the reflected light detector comprises a Geiger mode photodetector configured to detect the reflected light.

7. An electronic device, comprising:
   a ranging light source;
   a reflected light detector;
   a logic circuit configured to
      cause the ranging light source to emit ranging light at a target,
      detect reflected light from the target using the reflected light detector, the reflected light being a portion of the ranging light that reflects from the target back toward the reflected light detector,
      determine an intensity of the reflected light using the reflected light detector,
      determine a distance to the target based upon time elapsed between activating the ranging light source and detecting the reflected ranging light, and
      calculate reflectance of the target, based upon the intensity of the reflected light and the distance to the target;

calculate a coarse reflectance as:

$$\text{Coarse Reflectance} = \frac{(\text{Intensity of the reflected light} - A * e^{B*Distance})}{C + D * e^{E*Distance}}$$

where A is between −50 and −30, B is between −0.01 and −0.1, C is between 0.01 and 0.2, D is between 1 and 3, and E is between −0.01 and −0.1.

8. The electronic device of claim 7, wherein the logic circuit is configured to calculate the reflectance as:

$$\text{Reflectance} = \frac{\text{Intensity of the reflected light} - A * e^{B*Distance}}{C + D * e^{(F+G*Coarse\ Reflectance)*Distacne}}$$

where A is between −50 and −30, B is between −0.01 and −0.1, C is between 0.01 and 0.2, D is between 1 and 3, F is between −0.01 and −0.1, and G is between 0.0001 and 0.0005.

9. An electronic device, comprising:
a ranging light source;
a reflected light detector;
a logic circuit configured to
cause the ranging light source to emit ranging light at a target,
detect reflected light from the target using the reflected light detector, the reflected light being a portion of the ranging light that reflects from the target back toward the reflected light detector,
determine an intensity of the reflected light using the reflected light detector,
determine a distance to the target based upon time elapsed between activating the ranging light source and detecting the reflected ranging light, and
calculate reflectance of the target, based upon the intensity of the reflected light and the distance to the target;
the reflectance being calculated as:

$$\text{Reflectance} = \frac{\frac{\text{Intensity}}{1 - e^{-(H*Distance^I)}} - J}{K}$$

where H is between 300 and 500, I is between −2 and −1, J is between 18 and 28, and K is between 1.1 and 2.1.

10. The electronic device of claim 9, wherein the logic circuit is configured to normalize the intensity, based upon a reference reflected light detector, prior to calculation of the reflectance.

11. An electronic device, comprising:
a ranging light source;
a reflected light detector;
a logic circuit configured to
cause the ranging light source to emit ranging light at a target,
detect reflected light from the target using the reflected light detector, the reflected light being a portion of the ranging light that reflects from the target back toward the reflected light detector,
determine an intensity of the reflected light using the reflected light detector,
determine a distance to the target based upon time elapsed between activating the ranging light source and detecting the reflected ranging light, and
calculate reflectance of the target, based upon the intensity of the reflected light and the distance to the target;
at a first point in time when it is assumed that the reflected light detector is not fully occluded by the target:
estimate a reference intensity value representing intensity of the reflected light when the reflected light detector is fully occluded by the target as a function of an assumed reflectance and the distance to the target, and
determine a coverage value representing a percentage of occlusion of the reflected light detector by the target as a function of a ratio between the intensity of the reflected light and the reference intensity value.

12. The electronic device of claim 11, wherein the logic circuit calculates the reflectance at a second point in time when it is assumed that the reflected light detector is fully occluded by the target; and wherein the logic circuit is further configured to update the reference intensity value using the reflectance.

13. A method, comprising:
determining distance to a target;
determining intensity of light reflected from the target;
calculating a reflectance of the target as a function of the intensity of the light reflected from the target and distance to the target;
wherein the reflectance is calculated as a function of a quotient of first and second exponential functions, the first exponential function having the intensity of the reflected light as an offset and having the distance as an exponent of Euler's number, the second exponential function having an offset and having the distance to the target and a coarse reflectance as exponents of Euler's number.

14. The method of claim 13, further comprising determining a color of the target based upon the reflectance of the target.

15. The method of claim 13, wherein the reflectance is calculated by:
calculating an intensity of the light at a surface of the target as a product of the intensity of the reflected light and a square of the distance to the target;
determining the reflectance of the target based on the intensity of the reflected light at the surface of the target.

16. A method, comprising:
determining distance to a target;
determining intensity of light reflected from the target using a reflected light detector;
calculating a reflectance of the target as a function of the intensity of the light reflected from the target and distance to the target;
at a first point in time when it is assumed that the reflected light detector is not fully occluded by the target:
estimating a reference intensity value representing intensity of the reflected light when the reflected light detector is fully occluded by the target as a function of an assumed reflectance and the distance to the target, and
determine a coverage value representing a percentage of occlusion of the reflected light detector being by the target as a function of a ratio between the intensity of the reflected light and the reference intensity value.

17. The method of claim 16, wherein the reflectance is calculated at a second point in time when it is assumed that the reflected light detector is fully occluded by the target; and further comprising updating the reference intensity value using the reflectance.

\* \* \* \* \*